United States Patent
Patzschke et al.

(10) Patent No.: US 6,329,020 B1
(45) Date of Patent: *Dec. 11, 2001

(54) METHOD FOR THE PREPARATION OF A MULTILAYER COATING AND AQUEOUS COATING MATERIAL SUITABLE FOR THIS

(75) Inventors: Hans-Peter Patzschke; Armin Göbel, both of Wuppertal; Hans Ulrich Meier, Essen, all of (DE)

(73) Assignee: Herberts Gesellschaft mit beschrankter Haftung, Wuppertal (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/820,525

(22) Filed: Mar. 19, 1997

Related U.S. Application Data

(63) Continuation of application No. 08/652,138, filed on May 23, 1996, now abandoned, which is a continuation of application No. 08/363,304, filed on Dec. 22, 1994, now abandoned, which is a continuation of application No. 08/188,604, filed on Jan. 28, 1994, now abandoned, which is a continuation of application No. 08/004,175, filed on Jan. 13, 1993, now abandoned, which is a continuation of application No. 07/816,834, filed on Dec. 27, 1991, now abandoned, which is a continuation of application No. 07/213,998, filed on Jun. 30, 1988, now abandoned.

(30) Foreign Application Priority Data

Jul. 3, 1987 (DE) ................................ 37 22 005

(51) Int. Cl.$^7$ ....................................... B05D 1/36
(52) U.S. Cl. .................. 427/407.1; 427/299; 427/407.2; 427/409; 427/419.1; 427/412.3; 427/412.5; 524/457; 524/507
(58) Field of Search ............................ 427/407.1, 412.3, 427/412.5, 299, 407.2, 409, 419.1; 524/457, 507

(56) References Cited

U.S. PATENT DOCUMENTS

| | | | |
|---|---|---|---|
| 3,684,758 | * | 8/1972 | Honig et al. ......................... 524/457 |
| 3,684,759 | * | 8/1972 | Reiff et al. .......................... 524/457 |
| 4,318,833 | * | 3/1982 | Guagliardo .......................... 524/457 |
| 4,373,053 | * | 2/1983 | Sato .................................... 524/457 |
| 4,636,545 | * | 1/1987 | König ................................. 524/457 |
| 4,644,030 | * | 2/1987 | Loewrigkeit ........................ 524/457 |
| 4,730,021 | * | 3/1988 | Zom et al. ........................... 524/457 |
| 4,777,207 | * | 10/1988 | Redman ............................... 524/457 |
| 4,948,829 | * | 8/1990 | Mitsujii et al. ....................... 524/507 |

FOREIGN PATENT DOCUMENTS

| | | | |
|---|---|---|---|
| 1953348 | | 5/1971 | (DE) . |
| 2624442 | | 12/1976 | (DE) . |
| 2736542 | * | 9/1985 | (DE) . |
| 3545618 | | 12/1985 | (DE) . |
| 1489 | * | 4/1981 | (EP) . |
| 2081724 | * | 2/1982 | (GB) ................................. 524/457 |
| 2169911 | * | 7/1986 | (GB) . |
| 72088 | * | 6/1978 | (JP) ................................... 524/457 |
| 132641 | * | 7/1985 | (JP) ................................... 524/457 |
| 23225 | * | 6/1986 | (JP) . |
| 197072 | * | 9/1986 | (JP) . |

* cited by examiner

Primary Examiner—David W. Wu
(74) Attorney, Agent, or Firm—Schweitzer Cornman Gross & Bondell LLP

(57) ABSTRACT

Described are a method for the preparation of a multilayer coating and a coating material from an aqueous dispersion of a polymer with a particle diameter of the polymeric phase of 10 nm to 500 nm. The polymer has a number average molecular weight of 10,000 to 500,000 and an acid number of 12 to 40. The dispersion was obtained by polymerization without addition of emulsifier and in the presence of water insoluble initiators of a) 0.65 to 9 parts by weight of carboxyl group-free unsaturated monomers which, aside from the unsaturated bond, do not contain any other groups, which are reactive under the polymerization and curing conditions, together with 0 to 65% by weight, based on the total monomers of copolymerizable, hydroxyl group-containing monomers and/or 0 to 7% by weight, based on the total monomers, of ethylenically unsaturated monomers, in b) 1 part by weight, based on the resin portion, of an aqueous dispersion of a urea group-containing polyurethane, which was produced by chain extension of an NCO group-containing prepolymer based on polyester with an NCO group content of 1.0 to 10% with at least two urethane groups per molecule, with carboxyl groups corresponding to an acid number of 20 to 50 and a number average molecular weight of 600 to 6,000, with a polyamine with primary and/or secondary amino groups and/or with hydrazine in an aqueous medium without addition of emulsifier.

9 Claims, No Drawings

METHOD FOR THE PREPARATION OF A MULTILAYER COATING AND AQUEOUS COATING MATERIAL SUITABLE FOR THIS

This is a continuing application nf U.S. Ser. No. 08/652,138, filed May 23, 1996; which is a continuation of U.S. Serial No. 08/363,304, filed December 22, 1994; which is a continuation of U.S. Ser. No. 08/188,604, filed Jan. 28, 1994; which is a continuation of Ser. No. 08/004,175, filed on Jan. 13, 1993; which is a continuing application of Ser. No. 07/816,834, filed on Dec. 27, 1991; which is a continuing application of Ser. No. 07/213,998, filed on Jun. 30; 1988; all now abandoned.

FIELD OF INVENTION

The invention relates to a method for the preparation of a multilayer coating and to suitable aqueous, non-yellowing coating materials or coating compositions suitable for its implementation. These can be used as water-dilutable plain base coats or metallic base coats and are usually oversprayed with a clear lacquer, which is water dilutable or dissolved in organic solvents. The vehicles employed can be used as industrial paints, especially, for example, in the automobile industry. They lead to coatings which, aside from a good optical effect and excellent mechanical properties, result in good intermediate adhesion, show little swelling in water and can be applied trouble-free by electrostatic spraying. In addition, they are suitable for repair purposes, since they lead to excellent properties already when cured at low temperatures, such as 80° C.

BACKGROUND INFORMATION AND PRIOR ART

It is well known that substrates may be provided with several superimposed coating layers in order to obtain coatings with a good decorative effect and, at the same time, good protective properties. For example, multilayer coats of lacquer are applied preferably according to the so-called "base coat/clear coat" method. After a short exposure to air without a stoving step, the initially applied pigmented base lacquer is painted over by the "wet-on-wet" method with a clear lacquer. Both layers are then stoved together. Metal-effect lacquers are preferably processed in the automobile industry by this method. Because of the composition of the base lacquer, high proportions of solvents are consumed in this procedure. The problem therefore existed of converting such a lacquer system to a water-dilutable basis.

Such a vehicle must
- be applicable trouble-free by electrostatic spraying with, for example, high rotation bells
- be oversprayable "wet-on-wet" with conventional or water-dilutable clear lacquers, that is, in spite of the shortest possible air exposure times and/or the shortest possible heating times, no interfering incipient solution phenomena should be seen through the (transparent) covering layer;
- orient and fix metal-effect pigments spatially in order to achieve a good optical effect;
- for repair purposes, lead to films with excellent mechanical properties already after being cured at low temperatures, such as 80° C.; together with the clear lacquer, these films should be highly resistant to weathering.

In the development of such water-dilutable systems, problems arise, which are difficult to solve and are attributable to the special properties of water and to the low heating temperatures, at which practically no cross linking reactions take place. Attempts have been made in the past to arrive at suitable water-dilutable systems. However, it was not possible to combine all the desired properties optimally in one vehicle.

In the German Offenlegungsschrift 2,860,661, water-dilutable vehicles based on acrylate are described, which contain polymer microparticles, which are insoluble in non-aqueous solvents and water. They are prepared with the help of steric dispersion stabilizers by polymerization in non-aqueous solvents and subsequently transferred into the aqueous medium. This conversion process is very costly and also very susceptible to failure, because the effectiveness of the dispersion stabilizer can be affected by variations in the synthesis process. In the European Patent A 38 127, these vehicles are used for the preparation of metallic base coats, the aluminum platelets or pigments being brought into the lacquer with the help of a melamine resin. At low stoving temperatures, this resin acts like a plasticizer and worsens the moisture susceptibility of the film.

In the German Patent 2,736,542, primers for metal spools are described, which are based on acrylate resin/polyurethane dispersions. Combinations of polyurethane dispersions with latex polymers are used here, optionally with addition of melamine resins. Special combinations, which are matched to the requirements of metallic base coats, are not named.

In the German Offenlegungsschrift 1,953,348, a free radical emulsion polymerization of vinyl monomers is carried out in the presence of aqueous dispersions of high molecular weight polyurethanes with anionic groups. In the examples, the polyurethane dispersions contain alkali salts of 1:1 adducts of diamines and sultones. Because of the non-volatile salt content in the film, adhesion problems arise in multilayer lacquer structure. There are no special references to the selection of suitable polyurethane resins or of unsaturated monomers, with which the requirements of metallic base coats are fulfilled.

In the German Offenlegungsschrift 2,363,307, vinyl monomers are reacted by free radical polymerization in the presence of a polyurethane latex. In the examples, only polyurethane dispersions based on polypropylene glycol are used, which moreover are reacted with a relatively low monomer content. In so doing, films are formed in multilayer structures, which are not sufficiently resistant to the effects of moisture. Here also, special selection conditions cannot be inferred for the preparation of metallic base coats.

The German Offenlegungsschrift 3,545,618 relates strictly to polyurethane dispersions for the preparations of water base coats for multilayer coatings. There is no reaction with unsaturated monomers. They are prepared by reaction of linear polyether and polyester glycols, to which triols have been added, with diisocyanates in inert organic solvents. The resulting polyurethanes must be readily soluble in the solvents used. Neutralization and dilution with water is technically controllable only if relatively low molecular weight resins and increased amounts of solvent are used. The film properties show a high solvent sensitivity, which leads to difficulties during the application of the clear lacquer on the base coat. Higher molecular weight polyurethanes can be emulsified only with difficulty in water and lead to emulsions with very coarse particles. Stable systems require a high salt group content.

In the German Offenlegungsschrift 3,210,051, water-dilutable polyurethane dispersions are used for the preparation of metallic base coats. The dispersions are obtained by dispersing a neutralized anionic NCO prepolymer in water and subsequently subjecting it a chain extension with polyamines. These coating materials create problems when used under practical conditions in batch lacquering processes, because the rapidly drying coating materials in the application devices used (for example, lacquer spray gun or electrostatically supported high rotation bells) coagulate at the walls and adhere there so well, that they can be removed again only with great difficulty. The danger of forming pin-holes and gel particles in the film surface is therefore very great and a quick shade change is made formidable by difficult cleaning operations. Additional large amounts of solvent are introduced into the mixture by the addition of acrylate resin solutions. The addition of melamine resins makes it difficult to produce suitable water-resistant films at low stoving temperatures, as required for repairs.

In U.S. Pat. No. 4,318,833, thermoplastic polymers are prepared by polymerization of unsaturated monomers in the presence of fully reacted, water-soluble polyurethanes. The polymers either have oxidative drying properties or, after addition of cross linking agents such as aminoplasts, phenoplasts or blocked polyisocyanates, can be stoved during 10 to 15 minutes at 125° to 175° C. as coating lacquers, which can be pigmented. The water-soluble polyurethane resin can be prepared from polyether or polyester glycols and contains anionic or cationic groups. The resin must be readily soluble in the inert solvents required for the preparation. The neutralization and dilution with water can be controlled on an industrial scale only if relatively low molecular weight resins and increased amounts of solvent are used. The examples of this US patent show only that a polymerization of unsaturated monomers in the presence of a polyurethane dispersion is possible in the ratio of 2 parts of polyurethane to 1 part of monomers (based on the solids content). It has been ascertained that, with an increased monomer content, polymers are obtained, which are difficult to filter and lead to pinhole-containing lacquer films with an unusable surface. In some cases, the films show insufficient resistance to the action of water and solvents.

OBJECT OF THE INVENTION

It is therefore an object of the invention to provide a multilayer coating system that does not have the above disadvantages, using a largely physically drying vehicle system on an aqueous basis.

SUMMARY OF THE INVENTION

Surprisingly, it has been ascertained that this objective can be accomplished by a method for the preparation of a multilayer coating, in which a saturated base coating material of an aqueous dispersion of a polymer is applied on a substrate, wherein the polymer phase of the aqueous dispersion has particles with a diameter of 10 nm to 500 nm, the polymer has a number average molecular weight of 10,000 to 500,000 and an acid number of 12 to 40, and the dispersion was obtained by polymerization without the addition of emulsifier and in the presence of water-insoluble initiators, of a) 0.65 to 9 parts by weight of carboxyl group-free unsaturated monomers which, aside from the unsaturated bond, do not contain any other groups, which are reactive under the polymerization and curing conditions, together with 0 to 65% by weight, based on the total monomers, of polymerizable, hydroxyl group-containing monomers and/or 0 to 7% by weight, based on the total monomers, of ethylenically unsaturated monomers in b) 1 part by weight, based on the resin portion, of an aqueous dispersion of a urea group-containing polyurethane, which was produced by chain extension of an NCO group-containing prepolymer based on polyester with an NCO group content of 1.0 to 10% with at least two urethane groups per molecule, with carboxyl groups corresponding to an acid number of 20 to 50 and a number average molecular weight of 600 to 6,000, with a polyamine with primary and/or secondary amino groups and/or with hydrazine in an aqueous medium without addition of emulsifier, and, if necessary, the subsequent addition of pigments, fillers, solvents, thickeners and/or conventional lacquer adjuvants and additives, the base coating so obtained is exposed to air, a water-dilutable coating or a coating dissolved in organic solvents is applied and subsequently the substrate, so coated, is subjected to a heating process at temperatures up to 140° C.

The physically drying binder system for aqueous coating materials used pursuant to the invention for the base coating material, is one which can be sprayed electrostatically without coagulation phenomena in a suitably adjusted solvent. High rotation bells, for example, can be used for the spraying. Excellent coatings with an unusual combination of properties are obtained. It has been ascertained that the coatings obtained can be oversprayed "wet on wet" with clear lacquers without signs of incipient dissolution such as wrinkling effects and, on forced drying at temperatures of the order of, for example, 80° C. withstand storage over water without surface disorders and adhesion losses. The polyurethane dispersions, obtained pursuant to the invention, are not cross linked and, after freeze drying, are soluble in heated polar solvents such as N-methylpyrrolidone or dimethylformamide. The solutions form excellent films.

To prepare the inventive aqueous dispersion used as base coating material, an aqueous dispersion of the above-defined urea group-containing polyurethane b) is polymerized in a suitable manner in a reactor with the ethylenically unsaturated monomers a), which can be polymerized by a free radical mechanism.

The quantitative ratio of a) to b) varies from 30:70 to 90:10, based in each case on the weight of monomers a) or the weight of the resin portion of the polyurethane dispersion b). Preferably, an amount of less than 60% by weight and especially of less than 50% by weight of polyurethane is used, as is an amount of at least 20% and especially of at least 30%.

To prepare the aqueous dispersion, the ethylenically unsaturated monomers a), which can be polymerized by a free radical mechanism, can be added slowly to the aqueous dispersion of the polyurethane b). In this connection, it is possible to add the total amount of monomers at once, or also to add only a portion and to meter in the rest during the course of the reaction. Preferably however, the monomers can be pre-emulsified with the help of a portion of the polyurethane dispersion and water. This pre-emulsion is then slowly added to the reactor. The addition time of the monomers a) generally is 2 to 8 hours and preferably 3 to 4 hours.

The water-insoluble organic initiators, used for the suspension polymerization, are, for example, added to the reactor or added dropwise together with the monomers. They may, however, also be added portionwise in different concentrations to the reactor, which contains a portion of the monomers. The rest of the initiator is metered in with the remainder of the monomers. The free radical initiation is accomplished by thermal decomposition of organic peroxides such as t-butyl peroctoate or with azo compounds, such as azo-bis-isobutyronitrile. The reaction temperature arises from the decomposition rate of the initiator and can, if necessary, be lowered by suitable organic redox systems. In general, the polymerization takes place at a temperature of 30° to 100° C. and especially at a temperature of 60° to 95° C. The temperatures may, however rise up to 130° C., if pressures up to about 10 bar are employed.

The dispersions, so prepared, contain polymers with a number average molecular weight ($M_n$) of 10,000 to 500,000. The lower limit of the molecular weight lies preferably at 20,000 and especially at 30,000 and the upper limit preferably at 400,000 and especially at 300,000. Their acid number generally is between 12 and 40. The lower limit preferably is at 15 and the upper limit preferably is at 30.

The acrylates polyurethane dispersions preferably have a hydroxyl number of 5 to 100. The lower limit preferably is at 20 and the upper limit preferably is at 80.

Dispersions, which are suitable for metallic base coats, must filter well and form a pinhole-free, smooth film surface. These properties depend on the particle size. The particle size, in turn, depends in a complicated manner on the chemical structure of the polyurethane dispersion, the ratio of polyurethane to polymer resin as a function of the acid number of the polyurethane dispersion, the neutralizing agent and the degree of neutralization, as well as on the reaction conditions during the dispersing process, such as the temperature and the stirring speed. The particle size of the dispersions, reacted with unsaturated monomers, generally lies below 500 nm, preferably below 300 nm and especially below 200 nm. Preferably, it is greater than 10 nm and especially greater than 20 nm. A preferred range is of the order of 20 to 300 nm.

As ethylenically unsaturated monomers, practically all monomers, which can be polymerized by a free radical mechanism, come into consideration. However, the usual limitation for copolymerization apply. They are specified by the Q and e schedule of Alfrey and Price or by the copolymerization parameters (see, for example, Brandrup and Immergut, Polymer Handbook, 2nd ed., John Wiley & Sons, New York, (1975)).

The glass transition temperature of the acrylated polyurethane dispersion lies between 20° and 100° C.

Preferably, those monomers are used, which lead to a homopolymer, the glass transition temperature of which lies above the glass transition temperature of the polyurethane resin in the reactor. If monomer mixtures are used, such mixtures preferably lead to a copolymer, the glass transition temperature of which is higher than the glass transition temperature of the polyurethane resin in the reactor.

Preferably, monomer mixtures are used. Mixtures of the following composition are preferred:

| | | |
|---|---|---|
| a) | 15 to 100% by weight, especially 20 to 90% by weight, particularly 35 to 85% by weight | of unsaturated, especially ethylenically unsaturated monomers which do not carry any reactive groups other than the unsaturated bond, |
| b) | 0 to 65% by weight especially 10 to 60% by weight, particularly 15 to 50% by weight | copolymerizable, hydroxyl group-containing monomers, especially ethylenic, monounsaturated, hydroxyl group-containing monomers |
| c) | 0 to 7% by weight especially 0% by weight | polyunsaturated monomers, especially ethylenic polyunsaturated monomers. |

Unsaturated monomers, which contain no further reactive groups, are selected depending on the mechanical and compatibility properties. Alkyl acrylates, alkyl methacrylates and/or dialkyl maleates or fumarates are used. The alkyl groups of these esters consist of 1 to 20 carbon atoms and are disposed in a linear or branched aliphatic chain and/or as a cycloaliphatic and/or (alkyl)aromatic moiety. "Hard" monomers with a high glass transition temperature as polymer are, for example, monomers of vinyl-o-, m- or p-aromatic types, such as styrene, α-substituted styrenes such as a-methylstyrene, o-, m-, or p-alkylstyrenes such as vinyl toluene or p-tert-butylstyrene, halogenated vinylbenzenes such as o- or p-chlorostyrene, methacrylate esters with a short chain such as methyl methacrylate, ethyl methacrylate, propyl methacrylate, butyl methacrylate, cyclohexyl methacrylate, isobornyl methacrylate, dihydrodicyclopentadienyl methacrylate, (meth)acrylamide and/or (meth)acrylonitrile. "Soft" monomers, on the other hand, are acrylate esters with a long alcohol chain, such as n-butyl acrylate, isobutyl acrylate, t-butyl acrylate and/or 2-ethylhexyl acrylate. Unsaturated ethers such as ethoxyethyl methacrylate or tetrahydrofurfuryl acrylate may also be used. Monomers of the vinyl ester type, preferably vinyl esters of versatic acid can also be used proportionally under suitable reaction conditions.

Copolymerizable, hydroxyl group-containing monomers are understood to be those monomers which, aside from a polymerizable, ethylenically unsaturated group, contain at least one hydroxyl group at a $C_2$ to $C_{20}$ carbon framework. They are mainly unsaturated esterification products of the general formula

R"—CH=CR'—X—R'"

wherein R'=—H or —$C_nH_{2n+1}$
n=1 to 6 and preferably n=1, R"=—R' or —$COOC_nH_{2n+1}$; 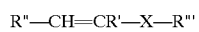
R'"=a linear or branched $C_{1-6}$ alkyl group with 1 to 3 OH groups, and X=—COO—, —CONH—, —$CH_2O$— or —O—.

Especially suitable are hydroxyalkyl methacrylates such as β-hydroxyethyl acrylate, β-hydroxypropyl methacrylate, 1,4-butylene glycol monoacrylate, propylene glycol monoacrylate, 2,3-dihydroxypropyl methacrylate, pentaerythritol monomethacrylate, polypropylene glycol monoacrylate or dihydroxyalkyl fumarate, the linear, branched or cyclic alkyl groups of which contain 2 to 20 carbon atoms. However, N-hydroxyalkyl methacrylamide, N-hydroxyalkylmonoamides or -diamides of fumaric acid such as N-hydroxyethyl acrylamide or N-(2-hydroxypropyl) methacrylamide can also be used. Special elastic properties may be obtained by using a reaction product of hydroxyalkyl methacrylate and ⊖-caprolactone. Other hydroxyl group-containing compounds are allyl alcohol, monovinyl ethers of polyols, especially glycols, such as monovinyl ethers of ethylene glycol and butylene glycol, as well as hydroxyl group-containing allyl ethers or esters such as 2,3-dihydroxypropyl monoallyl ether, trimethylolpropane monoallyl ether or allyl 2,3-dihydroxypropionate. Especially suitable are hydroxyalkylmethacrylates such as hydroxyethyl (meth)acrylates, such as mydroxyethyl methacrylate.

Ethylenically polyunsaturated monomers are understood to be compounds with at least 2 double bonds, which can be polymerized by a free radical reaction and have the general formula R—CH=CR'—A—(—CR'=CH—R)$_m$, with m=1 to 3 and preferably m=1, with the proviso that, aside from the meanings given further above, A is the basic general framework carrying the reactive double bond. Examples of A are the o-, m- or p-phenyl group and groups of the formula —X—alkyl—X', wherein the alkyl preferably has 2 to 18 carbon atoms, X and X' are identical or different joining groups, such as —O—, —CONH—, —COO—, —NHCOO— or —NH—CO—NH—. A may be, for example, a benzene ring, such as in divinylbenzene, which optionally may also be substituted as in p-methyldivinylbenzene or o-nonyldivinylbenzene.

Other suitable polyunsaturated monomers are reaction products of polyalcohols, especially dialcohols, with α,β-unsaturated carboxylic acids, like those that have already been defined. Examples of these are ethylene glycol diacrylate, ethylene glycol dimethacrylate, 1,4-butylene glycol diacrylate, 1,6-hexylene glycol diacrylate, neopentyl glycol dimethacrylate, triethylene glycol dimethacrylate, polyethylene glycol 400 diacrylate, glycerin dimethacrylate, trimethylolpropane triacrylate and/or pentaerythritol diacrylate. Polyfunctional monomers containing urethane and amide groups are prepared by the reaction of, for example, hexane diisocyanate or β-isocyanatoethyl methacrylate with hydroxyethyl (meth)acrylate or methacrylic acid. Examples of suitable compounds of a different structure are allyl methacrylate, diallyl phthalate, butylene glycol divinyl ether, divinylethyleneurea, divinylpropyleneurea, diallyl maleate, bis-maleimide, glyoxabisacrylamide and/or the reaction product of epoxide resin with (meth)acrylic acid or hemiesters of fumaric acid. Preferred is the use of difunctional unsaturated monomers, such as butylene glycol diacrylate or hexylene glycol diacrylate. When glycidyl methacrylate and methacrylic acid are used, the corresponding glycerin dimethacrylate is formed automatically during the polymerization. The nature and amount of polyunsaturated monomers should be matched carefully to the reaction conditions (catalysts, reaction temperature, solvent), so as to have no gelling. The amount of polyunsaturated monomers added also serves to increase the average molecular weight without having any gel formation. Preferably, however, no polyunsaturated monomer is added.

Preferred monomer combinations are, for example, alkyl meth)acrylates, styrene, hydroxyalkyl methacrylates as monounsaturated olefinic compounds an, if necessary, small amounts of divinylbenzene, butylene glycol diacrylate or hexylene glycol diacrylate as polyunsaturated compounds.

The polyurethane dispersion, initially added to the reactor or used to pre-emulsify the monomers, preferably is anionic and preferably has a particle size of no more than 150 nm, particularly of not more than 100 nm and especially of not more than 50 nm. The particle size of the polyurethane dispersion, reacted with unsaturated monomers, is highly dependent on the acid number of the pure polyurethane dispersion and its quantitative proportion in the end product. The acid number of the pure polyurethane dispersion is determined by the required acid number of the acrylated polyurethane dispersion and the proportion of monomer according to the formula $$SZ_{(PU)} = \frac{SZ_{(end\ product)} \times 100}{100 - \%\ monomer}$$

The acid number of the pure polyurethane dispersion should lie between 20 and 50. The upper limit preferably lies below 45 and the lower limit preferably above 25. This dispersion is prepared by chain extension of an NCO prepolymer with terminal isocyanate groups with polyamines and/or hydrazine after neutralization with tertiary amines and emulsification in water. Preferably, all isocyanate groups are reacted with diamines, optionally with proportional addition of higher polyamines. After this reaction, practically no basic amine nitrogen atoms should be left over. Preferably, urea group-containing polyurethane dispersions are prepared, which contain at least 2 and preferably 4 urethane groups and at least 1 carboxyl group in the NCO prepolymer. High molecular weight products with improved dispersibility are prepared with the help of this method.

The isocyanate group-containing prepolymers are prepared by the reaction of polyalcohols, preferably glycols or glycol mixtures with excess polyisocyanates at temperatures up to 150° C. and preferably of 50° to 130° C. in organic solvents, which do not react with isocyanate groups. The reaction is carried out until practically all the hydroxyl functions have been reacted. To ensure that the prepolymers have terminal isocyanate groups, the isocyanate compounds generally are used in such amounts, that there is a stochiometric excess of isocyanate of at least 5%. The preferred range lines between about 1.1 and 2.5 NCO groups for each active hydrogen atom present. A specially preferred stochiometric ratio of NCO to OH groups lies between 1.3 and 1.1. The NCO excess may be obtained by decreasing the proportion of the OH components or conversely by adding diisocyanates or triisocyanates. The NCO prepolymer contains at least 1% by weight and preferably at least 2% by weight of isocyanate groups, based on the solids content. The upper limit lies at about 10% by weight and preferably at 5% by weight. It contains at least 5% and preferably 10% by weight of urethane groups and no more than 25% by weight and preferably no more than 20% by weight of NHCOO groups.

The polyols, used to prepare the prepolymer, may be low and/or high molecular weight polyols. However, they may also contain unreactive carboxyl groups. The polymer mixture has an OH number of 50 to 400; the upper limit preferably lies below 300 and especially below 200. It is achieved by low molecular weight glycols, which are contained proportionally in the mixture and have a molecular weight of 90 to 350 and may contain aliphatic, alicyclic or aromatic groups. Examples of these are 1,4-butylene glycol, 1,2-butylene glycol, 1,6-hexylene glycol, 1,2-cyclohexylene glycol, 1,4-cyclohexanedimethanol, neopentyl glycol, neopentyl glycol hydropivalate, hydroxyethylated or hydroxypropylated bisphenol A, bisphenol F, hydrogenated bisphenol A, hydrogenated bisphenol F and their mixtures. The polyols may contain small amounts of higher polyols, such as trimethylpropane or trimethylolethane, in order to introduce branching. However, the amount must be so small, that no cross linked products are formed.

The low molecular weight glycols are also understood to include those which, aside from two hydroxyl groups, also contain a group capable of forming an anion, such as the carboxyl group. Their function is to give the polyurethane, which in general is not compatible with water, an acid number that is sufficiently large, so that the neutralized product forms a stable emulsion in water. Preferably, carboxylic acid or carboxylate groups are used. They should be so unreactive, that the isocyanate groups of the diisocyanate preferably react with the hydroxyl groups of the molecule. For this purpose, for example, alkanoic acids with two two substituents on the alpha carbon atom are used. The substituent may be a hydroxyl group, an alkyl group or preferably an alkylol group. These polyols have at least one and generally 1 to 3 carboxyl groups in the molecule. They have up to about 25 and preferably 3 to 10 carbon atoms. Examples of such compounds are dihydroxypropionic acid, dihydroxysuccinic acid and dihydroxybenzoic acid. A specially preferred group of dihydroxyalkanoic acids are the α,α-dimethylolalkanoic acids, which are characterized by the structure formula

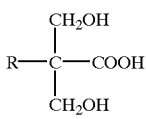

wherein R represents hydrogen or an alkyl group with up to 20 carbon atoms. Examples of such compounds are 2,2-dimethylolpentanoic acid, 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. The carboxyl group-containing polyol may constitute 3 to 30% by weight and preferably 5–15% by weight of the total polyol components in the NCO prepolymer.

High molecular weight polyols comprise predominantly saturated polyester glycols with a preferred hydroxyl number of 30 to 150 and especially of 60 to 130 and a preferred molecular weight of 400 to 5,000 and especially of 800 to 3,000. The preferred linear polyester glycols are prepared by esterification of organic dicarboxylic acids or their anhydrides with organic glycols or are derived from a hydroxycarboxylic acid or a lactone. Polyols or polycarboxylic acids with a higher functionality may be used to a slight extent in order to prepare branched polyester polyols. The dicarboxylic acids and glycols may be linear or branched aliphatic, cycloaliphatic or aromatic dicarboxylic or glycols.

The glycols, used for the preparation of the preferred linear polyesters, comprise, for example, alkylene glycols such ethylene glycol, propylene glycol, butylene glycol, 1,4-butylene glycol, 1,6-hexylene glycol, neopentyl glycol and other glycols such as dimethylolcyclohexane. Polyol mixtures may also be used, for example by esterifying small amount of higher molecular weight polyols, such as trimethylolethane, trimethylolpropane, glycerin or pentaerythritol. The amount must be measured out so that no cross-linked polyurethanes are formed. The acid component of the polyester consists primarily of low molecular weight dicarboxylic acids or their anhydrides with 2 to 30 and preferably 4 to 18 carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acid. During the formation of the polyester polyols, smaller amounts of carboxylic acids with 3 or more carboxyl groups, such as trimellitic anhydride, may also be present. To form bonds that are resistant to saponification, mixtures of dicarboxylic acids, which cannot form anhydrides, especially of aromatic dicarboxylic acids such as isophthalic acid, and aliphatic dicarboxylic acids such as adipic acid, are preferably used.

Pursuant to the invention, polyester glycols are also used, which are obtained by reacting a lactone with a glycol. For the preparation of the polyester glycols, the unsubstituted ε-caprolactam is used. The reaction with the lactone is started with low-molecular weight polyols such as ethylene glycol, 1,3-propylene glycol, 1,4-butylene glycol or dimethylolcyclohexane. However, other reaction components such as ethylene diamine, alkyldialkanolamines or also urea can also be reacted with caprolactone. As higher molecular weight glycols, polylactam glycols, which are prepared by reacting, for example, ε-caprolactam with low molecular weight glycols are suitable.

As typical multifunctional isocyanates, aliphatic, cycloaliphatic and/or aromatic polyisocyanates with at least two isocyanate groups per molecule are suitable. Preferred are the isomers or isomer mixtures of organic diisocyanates. Suitable as aromatic diisocyanates are phenylene diisocyanate, toluylene diisocyanate, xylylene diisocyanate, biphenylene diisocyanate, naphthylene diisocyanate and diphenylmethane diisocyanate.

Because of their good resistance to the effects of ultraviolet light, the (cyclo)aliphatic diisocyanates result in products with a lesser tendency to yellow. Examples of these are isophorone diisocyanate, cyclopentylene diisocyanate, as well as hydrogenation products of aromatic diisocyanates, such as cyclohexylene diisocyanate, methylcyclohexylene diisocyanate and dicyclohexylmethane diisocyanate. Aliphatic diisocyanates are compounds of the formula

wherein r is a whole number from 2 to 20, especially 6 to 8 and $R_2$, which may be the same or different, represents hydrogen or a lower alkyl group with 1 to 8 and preferably 1 or 2 carbon atoms. Examples of these are trimethylene diisocyante, tetramethylene diisocyanate, pentamethylene diisocyanate, hexamethylene diisocyanate, propylene diisocyanate, ethylene diisocyanate, dimethylethyleneene diisocyanate, methyltrimethylene diisocyanate and trimethylhexane diisocyanates. Especially preferred as diisocyanates are isophorone diisocyanate and dicyclohexylmethane diisocyanate. The polyisocyanate component, used to form the prepolymer, may also contain a proportion of higher functional polyisocyanates, provided that it is not affected by gel formation. As triisocyanates, products have proven their value, which are formed by trimerization or oligomerization of diisocyanates or by reaction of diisocyanates with polyfunctional compounds containing OH or NH groups. These include, for example, the biuret of hexamethylene diisocyanate and water, the isocyanurate of hexamethylene diisocyanate, the adduct of isophorone diisocyanate and trimethylolpropane or oxadiazine trione. The average functionality may be lowered, if necessary, by addition of monoisocyanates. Examples of such chain-terminating monoisocyanates are phenyl isocyanate, cyclohexyl isocyanate and stearyl isocyanate.

The NCO prepolymers to be used pursuant to the invention can be prepared by the simultaneous reaction of the polyol or polyol mixture with an excess of diisocyanate. On the other hand, the reaction can also be carried out stepwise in a prescribed sequence. The reaction may optionally be carried out in the presence of a catalyst such as organotin compounds and/or tertiary amines. To keep the reactants in a liquid state and to enable the temperature to be controlled better during the reaction, the addition of organic solvents, which do not contain any active hydrogen as defined by Zeriwitinoff, is possible. Usable solvents are, for example, dimethylformamide, esters, ethers such as diethylene glycol dimethyl ether, ketoesters, ketones such as methyl ethyl ketone and acetone, ketones substituted by methoxy groups, such as methoxyhexanone, glycol ether esters, chlorinated hydrocarbons, aliphatic and alicyclic hydrocarbon pyrrolidones such as N-methylpyrrolidone, hydrogenated furans, aromatic hydrocarbons and their mixtures. The amount of solvent can vary within wide limits and should be sufficient to form a prepolymer solution of suitable viscosity. Generally, 0.01 to 15% by weight and preferably 0.02 to 8% by weight, based on the solids content, is sufficient. If the optionally water-insoluble solvents have a boiling point lower than that of water, they can be distilled off under mild conditions after the preparation of the urea-containing polyurethane dispersion by vacuum distillation or thin-film evaporation. Higher boiling solvents should be largely water soluble and remain in the aqueous polyurethane dispersion to facilitate the confluence of the polymer particles during the film formation. Especially preferred as solvents are ketones such as methyl ethyl ketone, which are distilled off completely after the emulsion is formed.

The anionic groups of the NCO prepolymer are neutralized at least partially with a tertiary amine. The thereby created increase in dispersibility in water is sufficient for infinite dilution. It is also sufficient to ensure that a stable dispersion can be formed from the neutralized, urea group-containing polyurethane, which was obtained by chain extension. Suitable tertiary amines are, for example, trimethylamine, triethylamine, dimethylaniline, diethylaniline, N-methylmorpholine. The NCO prepolymer, optionally after being mixed with up to 10% by weight and preferably 6% by weight polyisocyanates with more than two NCO groups, preferably triisocyanates, and subsequent neutralization, is diluted with water and then forms a finely divided dispersion. Shortly thereafter, the still present isocyanate groups are reacted with diamines, optionally with the proportionate addition of higher polyamines with primary and/or secondary amino groups as chain extenders. This reaction leads to a further linkage and an increase in the molecular weight. To achieve optimum properties, the competing reaction between amine and water with the isocyanate must be coordinated well (time, temperature, concentration) and well monitored for a reproducible production. Water-soluble compounds are preferred as chain extenders, because they increase the dispersibility of the polymeric end product in water. Preferred are organic diamines, because they usually build up the highest molecular weight without gelling the resin. However, it is a prerequisite of this reaction that the ratio of amino groups to isocyanate groups is appropriately selected. The amount of chain extender is determined by its functionality, by the NCO content of the prepolymer and by the duration of the reaction. The ratio of reactive amino groups in the chain extender to the NCO groups in the prepolymer should, as a rule, be less than 1:1 and preferably fall within the range of 1:1 to 0.5:1. The presence of excess active hydrogen, especially in the form of primary amino groups, can lead to polymers with undesirably low molecular weights. The molecular weight can be increased by addition of polyisocyanates, such as diisocyanates or triisocyanates. Suitable as polyisocyanates with more than two NCO groups, which can be added to the NCO group-containing prepolymers before or after the chain extension, are, for example, those with a molecular weight of 165 to 750. Especially suitable are triisocyanates with such a molecular weight. A different preferred path is the addition of polyisocyanates containing more than two NCO groups, especially triisocyanates, after the chain extension. As examples of triisocyanate, those named above for incorporation into the NCO prepolymer can be used. It is understood that upper amount added is limited by the danger of gel formation or of poor dispersibility.

Polyamines essentially are alkylene polyamines with 1 to 40 carbon atoms and preferably about 2 to 15 carbon atoms. They may have substituents, which do not have any hydrogen atoms capable of reacting with isocyanate groups. Examples are polyamines with a linear or branched aliphatic, cycloaliphatic or aromatic structure and at least two primary amino groups. As diamines, ethylenediamine, propylenediamine, 1,4-butyldiamine, piperazine, 1,4-cyclohexyldimethylamine, 1,6-hexamethylenediamine, trimethylhexamethylenediamine, methanediamine, isophoronediamine, 4,4'-diaminodicyclohexylmethane and aminoethylethanolamine may be mentioned. Preferred diamines are alkyldiamines or cycloalkyldiamines such as propylenediamine and 1-amino-3-aminomethyl-3,5,5-trimethylcyclohexane. The chain extension can take place at least partially with a polyamine, which has at least three amino groups with reactive hydrogen, for example, diethylenetriamine. As chain extenders, it is also possible to used diamines, the primary amino groups of which are protected as ketimines and which become reactive only in the presence of water by splitting off the ketone. To prevent gelling during the chain extension reaction, it is also possible, especially if the NCO content is very high, to add small portions monoamines such as ethylhexylamine.

The above-defined polymers form the water-based vehicle of the coating material to be used pursuant to the invention. If necessary, they can be freed from unreacted monomer by increasing the temperature and optionally applying a vacuum, the excess monomer being distilled off. They may optionally be neutralized further, as a result of which adequate water dilutability results. For neutralization, ammonia and/or amines (especially alkylamines), aminoalcohols and cyclic amines such as diethylamine, triethylamine, dimethylaminoethanolamine, diisopropanolamine, morpholine or N-alkylmorpholine may be used. The more volatile amines are preferred for the neutralization.

The inventive, aqueous coating materials preferably are pigmented with a color. Those materials described in the German Standard DIN 55944, pages 1 to 4, of November, 1973, may be used as coloring matter. Conventional, commercial pigment preparations are also suitable. The inventive coating materials are particularly suitable for the incorporation of effect pigments, such as metal pigments (for example, aluminum bronzes) and/or lustrous pigments and/or interference pigments, from which excellent effect lacquers result. The effect pigments, such as the metal pigments or the luster pigments can be incorporated into the aqueous vehicle, for example, simply by mixing, if necessary, through proportional, concomitant use of solvents, water dispersants and thickeners. Grinding in mills is not necessary.

If colored metal effects or plain color shades are to be obtained, the respective pigments are carefully ground (dispersed) with a grinding resin in, for example, bead mills. Usable grinding resins are, for example, the previously described polyurethane dispersions or also the chain-extended pure polyurethane dispersions after neutralization and swelling with organic solvents and optionally water. In addition, water-dilutable polyester resins, acrylate resins and/or carboxyl group-containing polyurethane resins without chain extension can be used. The amount of paste or grinding resin or grinding agent should be as small as possible. However, in poor wetting pigments, up to 20% by weight of the vehicle may be replaced by the paste resin.

Especially preferred and suitable as grinding resin for pigments is a resin, which is obtained by free radical, solution polymerization. Such a resin preferably has a number average molecular weight ($M_n$) of 10,000 to 500,000, a glass transition temperature of −50° to +150° C., an acid number of 0 to 80 (mg KOH per g of resin solids), a hydroxyl number of 60 to 250 (mg KOH per g of resin solids) and a viscosity of 5 to 100 Paxsec in a 50% butoxyethanol solution at 25° C. It comprises preferably a) 0 to 12% by weight and especially 1 to 10% by weight of α,β-unsaturated carboxylic acids, b) 10 to 65% by weight and especially 15 to 50% by weight copolymerizable hydroxyl group-containing monomers, especially ethylenically monounsaturated hydroxyl group-containing monomers, c) 0 to 7% by weight and especially 0.1 to 5% by weight and more particularly 1.0 to 3% by weight of polyunsaturated monomers, especially ethylenically polyunsaturated monomers and d) 16 to 90% by weight and especially 35 to 85% by weight of unsaturated, especially ethylenically unsaturated monomers, which do not carry any reactive groups other than the unsaturated bond.

Examples of unsaturated monomers are the unsaturated monomers described above for the preparation of vehicle dispersions. To use this preferred resin as grinding resin, it is advisably neutralized at least partially with monoamines (for example, aliphatic monoamines, similar to those already described previously for the neutralization) and diluted with water to a viscosity suitable for the grinding.

When other grinding resins are used, the grinding can also be carried out without addition of water. The paste obtained is the added to the coating material, subsequently neutralized, if necessary, and diluted with water.

Such a preferred grinding material is, for example, a urethane-modified polyester, which is diluted with water-dilutable organic solvents and is prepared by the reaction of a) of an hydroxyl group-containing saturated polyester, obtained by the condensation of one or more multifunctional alcohols and aromatic, aliphatic and/or cycloaliphatic polycarboxylic acids or their anhydrides, with b) one or more aromatic, cycloaliphatic or aliphatic polyisocyanates, with the proviso that the equivalent ratio of OH groups to isocyanate groups is 10:1 to 1:1 and a portion of the multifunctional alcohols additionally contains a free carboxyl group, which has two additional aklylol groups as substituents at the a-carbon atoms, such as dimethylolpropionic acid. The proportion of free carboxyl groups is such, that the acid number of the resin is 40 to 100. The preparation of such resins, which are water soluble after neutralization because of their acid number of 40 to 100, is described, for example, in the German Offenlegungsschrift 1,915, 800.

Moreover, conventional rheological inorganic or organic additives may be added to the inventive coating materials. For example, thickening action is exhibited by water-soluble cellulose ethers, such as hydroxyethylcellulose, methylcellulose or carboxymethylcellulose, synthetic polymers with ionic and/or associative groups, such as polyvinyl alcohol, poly(meth)acrylamide, poly(meth)acrylic acid, polyvinylpyrrolidone, styrene/maleic anhydride or ethylene/maleic anhydride copolymers and their derivatives or also hydrophobically modified ethoxylated polyurethanes or polyacrylates. Especially preferred are carboxyl group-containing polyacrylate copolymers with an acid number of 60 to 780 and preferably of 200 to 500, which can also be used to wet the metal effect pigments.

Solvents and neutralizing agents, similar to those described above for the poly(meth)acrylate resins, can be added to correct the rheological properties as wall as the pH values and to improve the shelf life and spraying properties of the inventive coating materials. In the inventive coating materials, the proportion of organic solvents is kept as low as possible. For example, it is less than 15% by weight and preferably less than 12% by weight. The amount of solvent must, however, not be lowered so far, that there is interference with the smooth application of the lacquer due to rapid coagulation of the dispersion.

The inventive coating materials are pseudoplastic and generally have a solids content of about 10 to 50% by weight. The pseudoplasticity of the coating material can be adjusted at will by the solvent content, the neutralizing agent and the degree of neutralization, as well as the solids content. The solids content varies with the intended application of the coating material. For metal lacquers, it preferably is, for example, about 10 to 25% by weight. For plain colored lacquers, it is higher, for example, about 15 to 50% by weight.

The inventive aqueous coating materials can already be coated at low temperatures, if necessary, with the addition of catalysts. The curing can also take place after coating with a conventional clear lacquer, the either a predrying step or, preferably, a wet-on-wet procedure being used. If 2-component clear lacquers are used (for example, acrylateisocyanate and/or polyester-isocyanate), especially advantageous properties with respect to water resistance, resistance to stone chipping, adhesion and weathering resistance are obtained already with low curing temperatures. Such curing temperatures vary, for example, from 80° to 130° C. Temperatures of more than 120° C. are preferred for a 1-component clear lacquer (acrylate-melamine or polyester-melamine).

The thicknesses of the dried film preferably are 10 to 30 μm for the coatings of the inventive coating materials and 30 to 60 μm when a clear lacquer is used in addition. Pursuant to the invention, a clear, high solids lacquer is preferably used as covering lacquer. Coating with a clear lacquer is not absolutely essential, but is particularly advantageous in the motor vehicle industry.

Due to the use of vehicles that have not been cross linked, a good flow, which leads to smooth surfaces, is achieved with the inventive coating materials. Moreover, the bronze orientation in metallic lacquers is improved. The water resistance of the coatings achieved is excellent. When used in the motor vehicle sector, excellent stone chipping resistance is achieved.

The inventive, water-containing and water-dilutable coatings have the advantage that they do not yellow. They can be used as base lacquer and as covering lacquer. Their use as base lacquer is preferred. After a predrying, these base lacquers can be painted over with a clear covering lacquer and both layers can then be dried (stoved) together. As clear covering lacquers, the known, conventional, solvent-containing lacquers, such as one-component and two-component clear lacquers (and here especially the two-component high solids types), as well as water-dilutable clear lacquers) can be used. Good adhesion is achieved on different substrates with the inventive coating materials. A further object of the invention is therefore the use of the aqueous coating materials for preparing a coating on a substrate by applying on the surface of the substrate, if necessary, an additional layer of a clear lacquer dissolved in water or in an organic solvent and heating to temperatures of 60 to 150° C. Substrates are the usual objects coated with coating materials of this type, especially motor vehicle parts, which may also aleady be coated with a primer or a filler.

The lacquer may be applied by methods, usually employed in the lacquer industry, for example, by spraying, dipping or rolling or by the use of a doctor blade. In this connection, it should be mentioned that electrostatic spraying on the so-called high rotation bells referred to above is possible.

Suitable as substrate are various metals and metal alloys, such as iron or steel, aluminum and brass, but also plastics and glass. The lacquer can be applied directly or, as is customary in the automobile industry, after the application of a cathaphoresis primer and a filler.

PREPARATION EXAMPLE 1

Preparation of the Vehicle

A) Polyurethane Dispersion (Component b)

In a reactor equipped with stirrer, internal thermometer, reflux condenser and heater, 1047 g of a linear polyester (built up from adipic acid, isophthalic acid and 1,6-hexylene glycol) with a hydroxyl number of 135, an acid number of 1.3 and a viscosity of 290 mPa×sec (measured as an 80% solution in acetone) after addition of 98.8 g of dimethylolpropionic acid, is dissolved in 164 g N-methylpyrrolidone to form a homogeneous solution. After that, 491 g of isophorone diisocyante are added at 45° C. When the exothermic reaction has subsided, the temperature is raised slowly over a period of 2 hours to 80° C. The temperature is maintained at this level until the NCO content is 1.6%. While diluting with 164 g of N-methylpyrrolidone and 1272 g acetone, the solution is cooled to room temperature, after which 66 g of triethylamine and 3038 g of fully deionized water are added in rapid succession. Five minutes after the addition, the resin, which has been dispersed well by stirring, is treated with a mixture of 16.4 g ethylenediamine and 71 g water. The reaction temperature is subsequently increased over a period of 2 to 3 hours to 90° C., the acetone being distilled off, if necessary, under vacuum.

| | |
|---|---|
| solids content | 31.4% by weight (30 minutes at 150° C.) |
| acid number | 28 (mg KOH per g of solid resin) |
| pH | 7.8 |
| MEQ value | 33 (milliequivalents amine per 100 g of solid resin) |

B) Reaction of the Polyurethane Dispersion with Ethylenically Unsaturated Monomer (Component a))

The above-prepared polyurethane dispersion (1351 g) is diluted with 364 g of fully deionized water and heated to 90° C. A mixture of 48.4 g isobutyl acrylate, 58.8 g hydroxypropyl methacrylate, 14 g butyl acrylate and 157.2 g methyl methacrylate, in which 2 g of azo-bisisobutyronitrile was previously dissolved, is added slowly over a period of 6 hours. Subsequently, the temperature is maintained until the monomers have polymerized completely, If necessary, the initiation is repeated. A small portion of coagulate was filtered off. The ratio of polyurethane to acrylate monomers is 60:40.

| | |
|---|---|
| solids content | 34.6% by weight (60 minutes at 150° C.) |
| acid number | 17 |
| pH | 7.1 |
| MEQ value | 21 |

Preparation of a Hydroxyl Group-Containing Polymer Resin as Paste Resin for Grinding Pigments Butoxyethanol (1927 g) is heated in a 3-neck flask under reflux and an inert gas atmosphere to 120° C. With the help of a dropping funnel, a mixture of 92 g methacrylic acid
331 g hydroxypropyl acrylate
462 g isobutyl acrylate
1134 g methyl methacrylate
34 g hexylene glycol diacrylate
14 g t-butyl-peroxy-2-ethoxyhexanoate is then added slowly over a period of 3 hours with good stirring, the reaction temperature being maintained at 120° C. The initiation with t-butyl-peroxy-2-ethoxyhexanoate is repeated twice at intervals of 2 hours and the polymerization of the resin is then completed.

Final values:

| | |
|---|---|
| solids content | 51.6% by weight (30 min. at 180° C.) |
| acid number | 29 mg KOH per g of solid resin |
| viscosity | 29 Pa × sec at solids content |

The hydroxyl group-containing polymer resin is then provided with 27 g of N-methylmorpholine and 428 g of water and stirred for 3 hours. This solution is kept for 24 hours at room temperature and, if necessary, adjusted with methylmorpholine to a pH of 7.3 to 7.6.

EXAMPLE 1

Preparation of a Metallic Base Lacquer

The acrylated polyurethane dispersion (269 g), named in Preparation Example B, is provided with 5 g of N-methylmorpholine and 79 g of butoxyethanol with stirring. Subsequently, 322 g of a 3% conventional commercial thickener solution based on a polyacrylate dispersion is added with stirring and adjusted with N-methylmorpholine to a pH between 7.3 and 7.6.

Parallel to this, 40 g of a conventional commercial aluminum bronze with an aluminum content of 65% is made into a paste with a mixture of 10 g water, 10 g butoxyethanol, 15 g of a conventional commercial HMM melamine resin and 75 g of the neutralized paste resin described in the preparation example. Subsequently, it is allowed to flow with stirring into the above-described vehicle solution. Subsequently, while stirring (approximately 800 rpm) 175 g of water is added slowly. Finally the viscosity is adjusted with water to a value suitable for spraying, namely 30 seconds according to DIN 53211.

EXAMPLE 2

Preparation of a Tinted Paste

The neutralized paste resin (498 g ), described in the preparation example and diluted with water to a solids content of 27%, is adjusted with N-methylmorpholine to a pH of 7.6 to 8.0 and predispersed for 15 minutes in the dissolver, at 21 m/sec with 50 g of an inorganic black pigment (carbon black), 337 g fully deionized water and 9 g of N-methylmorpholin. Subsequently, it is milled for 90 minutes in a bead mill at temperatures of about 60° C. The milled material finally is finished with 96 g of water. This pigment paste has a high transparency and is outstandingly suitable for tinting water-dilutable metallic and plain base lacquers

EXAMPLE 3

Preparation of a Black Plain Base Lacquer

To the acrylated polyurethane dispersion (410 g), named in Preparation Example B, 6.7 g of N-methylmorpholine and subsequently 364 g of a 3% conventional commercial polyacrylate-based thickener solution are added with stirring. After stirring for 15 minutes, 208 9 of the black tinted paste described in Example 2 and 52 g of butoxyethanol are added. Finally, using water, the viscosity is adjusted to a spraying value of 30 seconds according to DIN 53211.

EXAMPLE 4

Lacquer Build-up

On a zinc phosphated automobile body sheet, which has been lacquered with an electro-dipcoat and a filler, sufficient metallic base lacquer or plane base lacquer, described in Examples 1 or 3, is applied with a flow spray gun, that a dry film about 15 µm remains after drying first for 5 minutes at 20° C. and then for 5 minutes at 80° C. This film is painted over with a conventional, commercial clear lacquer (for example, a two-component, high solids clear lacquer) and stoved for 30 minutes at 130° C. The dry film of clear lacquer is about 40 µm thick. The lacquer surface so obtained, has a fine, uniform, bright, metal effect. The lacquer film is provided down to the filler with a fine knife with the so-called conductor section and tested eight times according to the so-called adhesive tape tear-off method. No loss of adhesion is noted. A further test plate, prepared as described above, is kept for 120 hours in warm water at 40° C. After reconditioning phase of 1 hour, the lacquer film is free of bubbles, wrinkling and dulling.

Comparison Test: (with a polymer dispersion, the acid number of which is less than 12).

A conventional, commercial polyurethane dispersion (884 g) with an acid number of about 25, which contains an OH-polyester, is heated after dilution with 691 g of fully deionized water to 80° C. and a mixture of 71.8 g butyl acrylate, 87.4 g hydroxyethyl acrylate, 12.8 g isobutyl acrylate, 241.8 g methyl methacrylate and 10.4 g t-butyl-peroxy-2-ethylhexanoate is added over a period of 3 hours. The batch thickens and forms a grits-like coagulate at the stirrer and walls.

(weight ratio of polyurethane to monomer=43:57)

PREPARATION EXAMPLE 2

A. Polyurethane Dispersion

In a reactor equipped with stirrer, internal thermometer, reflux condenser and heater, 410 g of a linear polyester (built up from adipic acid, isophthalic acid, 1,6-hexylene glycol) with a hydroxyl number of 135 and a viscosity of 190 mpas (measured in an 80% acetone solution) is dissolved after addition of 40.2 g dimethylolproponic acid in 69 g N-methylpyrrolidone to form a homogeneous solution. After that, 222 g isophorone diisocyanate is added slowly at 45° C., the reaction temperature increasing up to 80° C. It is held at this temperature until the NCO content is 2.6%. The solution is diluted with 69 g N-methylpyrrolidone and 484 g acetone and cooled to room temperature. A solution of 67 g isocyanurate of the isophorone diisocyanate in 67 g acetone is then stirred in. After addition of 30 g of triethylamine, the resin is dispersed in 1123 g of fully deionized water and a mixture of 12.6 g ethylenediamine and 405 g water is added rapidly. The reaction temperature is subsequently increased over 2 to 3 hours to 90° C., during which time the acetone is distilled off, if necessary under vacuum.

| solids content | 31.6% by weight (30 minutes at 150° C.) |
| --- | --- |
| acid No.: | 25 (mg KOH per g of solid resin) |
| pH: | 7.6 |
| MEQ value: | 34 (mequiv. of amine per 100 g resin) |

B. Reaction of the Polyurethane Dispersion with Ethylenically Unsaturated Monomers In 334 g of the above-prepared dispersion A), which is diluted with 220 g fully deionized water and 0.4 9 triethylamine, 139 g methyl methacrylate, 60 g hydroxyethyl acrylate, 69 g butyl acrylate and 7 g azo-bis-isobutyronitrile are emulsified. A monomer emulsion is obtained. The polyurethane dispersion A) (1,002 g) is diluted with 150 g of fully deionized water in the reactor. After that, 10% of the monomer emulsion and 0.7 g azo-bis-isobutyronitrile are added. After heating to 80° C., the remainder of the monomer emulsion is added over a period of 2.5 hours. The temperature is subsequently held at this level until the monomers have polymerized completely, if necessary, after addition of additional initiator. A stable dispersion is formed, which shows no signs of coagulation.

| solids content: | 34.8% by weight (60 minutes at 150° C.) |
| --- | --- |
| acid No.: | 16 |
| pH: | 7.4 |
| MEQ value: | 22 |
| ratio of polyurethane to monomer: | 60:40 |
| average particle size: | 166 nm |

PREPARATION EXAMPLE 3

A. Polyurethane Dispersion

In a reactor equipped with stirrer, internal thermometer, reflux condenser and electrical heater, 743 g of a linear polyester (built up form azelaic acid, isophthalic acid and 1,6-hexylene glycol) with a hydroxyl number of 110 and a viscosity of 210 mPas (measured as an 80% solution in acetone) is dissolved after addition of 178 g of dimethylolpropionic acid in 149 g of N-methylpyrrolidone to form a homogeneous solution. After that, 535 g of isophorone diisocyanate are added at 45° C. and, after the exothermic reaction subsides, the temperature is raised slowly over a period of 2 hours to 80° C. This temperature is maintained until the NCO content is 2.2%. After diluting with 149 g of N-methylpyrrolidone and 1046 g acetone, the solution is cooled to room temperature, after which 124 g of triethylamine and 2034 g of fully deionized water are added in rapid succession. After 5 minutes, a mixture of 19 g ethylenediamine and 700 g water is added to the well-dispersed resin. Subsequently, the reaction temperature is increased to 90° C. over 2 to 3 hours, the acetone being distilled off, if necessary under vacuum.

| solids content: | 32.4% by weight (30 minutes at 150° C. |
| --- | --- |
| acid No.: | 50 (mg KOH per g of solid resin) |
| pH: | 7.3 |
| MEQ value: | 77 |

B. Reaction of the Polyurethane Dispersion with Ethylenically Unsaturated Monomers In a mixture of 160 g of the polyurethane dispersion A) with 283 g of fully deionized water and 0.8 g triethylamine, 138 g styrene, 138 g methyl methacrylate, 103 g hydroxyethyl acrylate, 103 g butyl acrylate and 12.2 g azo-bis-isobutyronitrile are emulsified. A monomer emulsion is obtained. The above-prepared polyurethane dispersion A) (479 g) is diluted with 566 g fully deionized water in the reactor and 10% of the monomer emulsion and 1.2 g of azo-bisisobutyronitrile are added. After heating to 80° C., the remainder of the monomer emulsion is added over a period of 3 hours. The temperature is subsequently maintained at 80° C., if necessary, with additional initiation, until the monomers have polymerized completely. A stable dispersion is formed, which can be filtered well and shows no coagulate.

| | |
|---|---|
| solids content: | 34.2% by weight (60 minutes at 150° C.) |
| pH: | 6.9 |
| MEQ value: | 22 |
| ratio of polyurethane to monomer = 30:70 | |
| average particle size = 90 nm | |
| (measured by photon relaxation spectroscopy) | |

EXAMPLE 5

With the polyurethane dispersion, obtained above in Preparation Example 2, a metallic base lacquer, which led to good metal effects, was prepared as described in Example 1.

What is claimed is:

1. A method for the preparation of a multilayer coating for motor vehicles, which comprises a saturated base coat prepared from an aqueous dispersion of a particulate polymer phase applied to a substrate, said polymer phase containing particles having a diameter of from 10 nm to 500 nm, the polymer having a number average molecular weight of from 10,000 to 500,000 and an acid number of from 12 to 40, wherein said aqueous dispersion is obtained by polymerization, without addition of an emulsifier and in the presence of a water insoluble polymerization initiator, of:

(a) from 0.65 to 9 parts by wt. of at least one unsaturated monomer that does not contain any carboxyl moiety and, other than the unsaturated bond, does not contain any other moiety that is reactive under the polymerization conditions and under the conditions of any subsequent curing, together with from 10 to 65% by weight, based on the total monomers, of one or more hydroxyl moiety containing monomers that are copolymerizable with said unsaturated monomer, said hydroxyl moiety containing monomer having the following formula:

R″—CH=CR′—X—R‴ wherein R′=—H or —$C_nH_{2n+1}$;
n=1 to 6;

R″=R′ or —$COOC_nH_{2n+1}$; R‴=a linear or branched $C_{1-6}$ alkyl group with 1 to 3 OH groups; and
X=—COO—, —CONH—, —$CH_2O$ or —O—,
and from 0 to 7 wt %, based on the total monomers, of a monomer which is ethylenically polyunsaturated, in the presence of (b) 1 part by of an aqueous dispersion of a urea containing polyurethane, based on the polyurethane portion, which is produced by chain extension of a prepolymer containing an NCO moiety, said prepolymer being based on a polyester containing from 1 to 10% NCO moieties with at least two urethane moieties per molecule, and containing at least partially neutralized carboxyl moieties corresponding to an acid number of from 20 to 50 and having a number average molecular weight of from 600 to 6,000, with a polyamine having having reactive amino groups selected from the group consisting of primary and secondary amino groups in an aqueous medium without any added emulsifier, drying the base coated substrate, and applying to the base coat a transparent second coat, said second coat being water-dilutable, or being dissolved in an organic solvent, and baking the coated substrate at a maximum temperature of 140° C.

2. The method of claim 1, wherein 1 to 5 parts by weight of component a) are used per one part by weight of component b).

3. The method of claim 1, wherein the acid number of the polymer in the aqueous dispersion is 15 to 30.

4. The method of claim 1, wherein the acid number of component b) is 25 to 50.

5. The method of claim 1, wherein polyamines are added during the preparation of the aqueous dispersion of the urea containing polyurethane b) in such an amount, that the ratio of the reactive amino groups to the NCO moieties is less than or equal to 1:1.

6. The method of claim 1, wherein said unsaturated monomer in (a) is a member from the group consisting of styrene and alkyl methacrylates.

7. The method of claim 1, further comprising adding to said pre-polymer, before or after the chain extension, polyisocyanate containing more than two NCO moieties.

8. The method of claim 5, wherein said ratio is from 1:1 to 1:0.5.

9. The method of claim 1, further comprising adding to the material of the base coat, prior to its application to the substrate, one or more of a pigment, filler, solvent, thickener, and lacquer additive.

* * * * *